US010111244B2

(12) United States Patent
Lee et al.

(10) Patent No.: US 10,111,244 B2
(45) Date of Patent: *Oct. 23, 2018

(54) METHOD AND APPARATUS FOR PERFORMING BACKOFF FOR SCHEDULING REQUEST IN WIRELESS COMMUNICATION SYSTEM

(71) Applicant: LG Electronics Inc., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/266,856

(22) Filed: Sep. 15, 2016

(65) Prior Publication Data
US 2017/0006625 A1 Jan. 5, 2017

Related U.S. Application Data

(63) Continuation of application No. 14/433,491, filed as application No. PCT/KR2013/009483 on Oct. 23, 2013, now Pat. No. 9,474,087.
(Continued)

(51) Int. Cl.
H04W 72/12 (2009.01)
H04W 74/08 (2009.01)
(Continued)

(52) U.S. Cl.
CPC ....... *H04W 72/1247* (2013.01); *H04W 72/02* (2013.01); *H04W 72/0413* (2013.01);
(Continued)

(58) Field of Classification Search
CPC .. H04L 27/2613; H04L 5/0053; H04W 72/04; H04W 72/12; H04W 72/1284; H04W 74/006; H04W 74/0833
See application file for complete search history.

(56) References Cited

U.S. PATENT DOCUMENTS

2010/0098011 A1 4/2010 Pelletier et al.
2010/0118864 A1 5/2010 Kubler
(Continued)

FOREIGN PATENT DOCUMENTS

CN 102084709 A 6/2011
WO 2008045658 A1 4/2008
(Continued)

OTHER PUBLICATIONS

Philips: "Triggering of Scheduling Request", 3GPP TSG-RAN WG2 #62, Tdoc R2-082453, May 5-9, 2008.
(Continued)

*Primary Examiner* — Curtis A Alia
(74) *Attorney, Agent, or Firm* — Dentons US LLP

(57) ABSTRACT

A method and apparatus for scheduling uplink (UL) transmission in a wireless communication system is provided. A user equipment (UE) receives a backoff parameter from a network, and determines whether or not to apply the received backoff parameter before transmitting a scheduling request (SR) to the network via a dedicated channel. Whether or not to apply the received backoff parameter is determined according to a prioritized access, and the prioritized access corresponds to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

15 Claims, 8 Drawing Sheets

Related U.S. Application Data

(60) Provisional application No. 61/717,616, filed on Oct. 23, 2012.

(51) Int. Cl.
*H04W 72/02* (2009.01)
*H04W 72/04* (2009.01)

(52) U.S. Cl.
CPC ... *H04W 72/1268* (2013.01); *H04W 72/1284* (2013.01); *H04W 72/1289* (2013.01); *H04W 74/0875* (2013.01)

(56) References Cited

U.S. PATENT DOCUMENTS

| | | |
|---|---|---|
| 2011/0216713 A1 | 9/2011 | Kim et al. |
| 2011/0237231 A1 | 9/2011 | Horneman et al. |
| 2011/0274040 A1 | 11/2011 | Pani et al. |
| 2012/0033613 A1 | 2/2012 | Lin |
| 2012/0163313 A1* | 6/2012 | Jung .................. H04W 72/048 370/329 |
| 2012/0281566 A1 | 11/2012 | Pelletier |

FOREIGN PATENT DOCUMENTS

| | | |
|---|---|---|
| WO | 2009116939 A2 | 9/2009 |
| WO | 2010-107354 A1 | 9/2010 |

OTHER PUBLICATIONS

LG Electronics Inc.: Issues with Scheduling Request Procedure, R2-081597, 3GPP TSG-RAN WG2 #61bis, Shenzhen, China, Mar. 31-Apr. 4, 2008.

NTT Docomo Inc.: "Problem caused by DRX UE in congested network", R2-122543, 3GPP TSG-RAN2#78, Prague, Czech, May 21-25, 2012.

NTT Docomo Inc.: "The necessity of access control in RRC_CONNECTED", R2-123712, 3GPP TSG-RAN2#79, Qingdao, China, Aug. 13-17, 2012.

NTT Docomo Inc.: "The necessity of access control in RRC_CONNECTED", R2-124412 (Resubmission of R2-123712), 3GPP TSG-RAN2#79bis, Bratislava, Slovakia, Oct. 8-12, 2012.

* cited by examiner

METHOD AND APPARATUS FOR PERFORMING BACKOFF FOR SCHEDULING REQUEST IN WIRELESS COMMUNICATION SYSTEM

This is a Continuation Application of U.S. patent application Ser. No. 14/433,491 filed Apr. 3, 2015, which is a 35 U.S.C. § 371 National Stage entry of International Application No. PCT/KR2013/009483, filed Oct. 23, 2013, which claims benefit of Provisional Application No. 61/717,616 filed Oct. 23, 2012, both of which are incorporated by reference in their entirety herein.

BACKGROUND OF THE INVENTION

Field of the Invention

The present invention relates to wireless communications, and more particularly, to a method and apparatus for performing backoff for a scheduling request in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

In 3GPP LTE, a scheduling request (SR) is used for requesting uplink shared channel (UL-SCH) resources for new transmission. For example, if a user equipment (UE) does not have allocated uplink radio resources when a buffer status report (BSR) is triggered, the UE performs a SR procedure for receiving uplink radio resources from a BS. The UE may transmit the trigger BSR using the allocated uplink radio resources by the SR procedure.

Meanwhile, backoff may be performed for a random access procedure. Backoff means that transmission of a random access preamble is delayed if a random access response reception and/or contention resolution in the random access procedure is considered not successful.

Currently, backoff is not performed for the SR. However, a method for performing backoff for the SR may be considered.

SUMMARY OF THE INVENTION

The present invention provides a method for performing backoff for a scheduling request (SR) in a wireless communication system. The present invention provides a method for determining whether to apply a backoff parameter before transmitting an SR.

In an aspect, a method for scheduling uplink (UL) transmission in a wireless communication system is provided. The method includes receiving a backoff parameter from a network, and determining whether or not to apply the received backoff parameter before transmitting a scheduling request (SR) to the network via a dedicated channel.

Whether or not to apply the received backoff parameter may be determined according to a prioritized access.

The prioritized access may correspond to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

It may be determined to apply the received backoff parameter if the prioritized access is not identified. The method may further include performing backoff based on the received backoff parameter before transmitting the SR to the network.

It may be determined not to apply the received backoff parameter if the prioritized access is identified. The method may further include ignoring the received backoff parameter before transmitting the SR to the network.

The method may further include receiving a backoff configuration from the network via one of system information, a paging, and a radio resource control (RRC) connection reconfiguration message. The backoff configuration may include the backoff parameter.

The method may further include transmitting the SR to the network via the dedicated channel.

In another aspect, a user equipment (UE) in a wireless communication system is provided. The UE includes a radio frequency (RF) unit for transmitting or receiving a radio signal, and a processor coupled to the RF unit, and configured to receive a backoff parameter from a network, and determine whether or not to apply the received backoff parameter before transmitting a scheduling request (SR) to the network via a dedicated channel.

Important access trials can avoid blocking.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
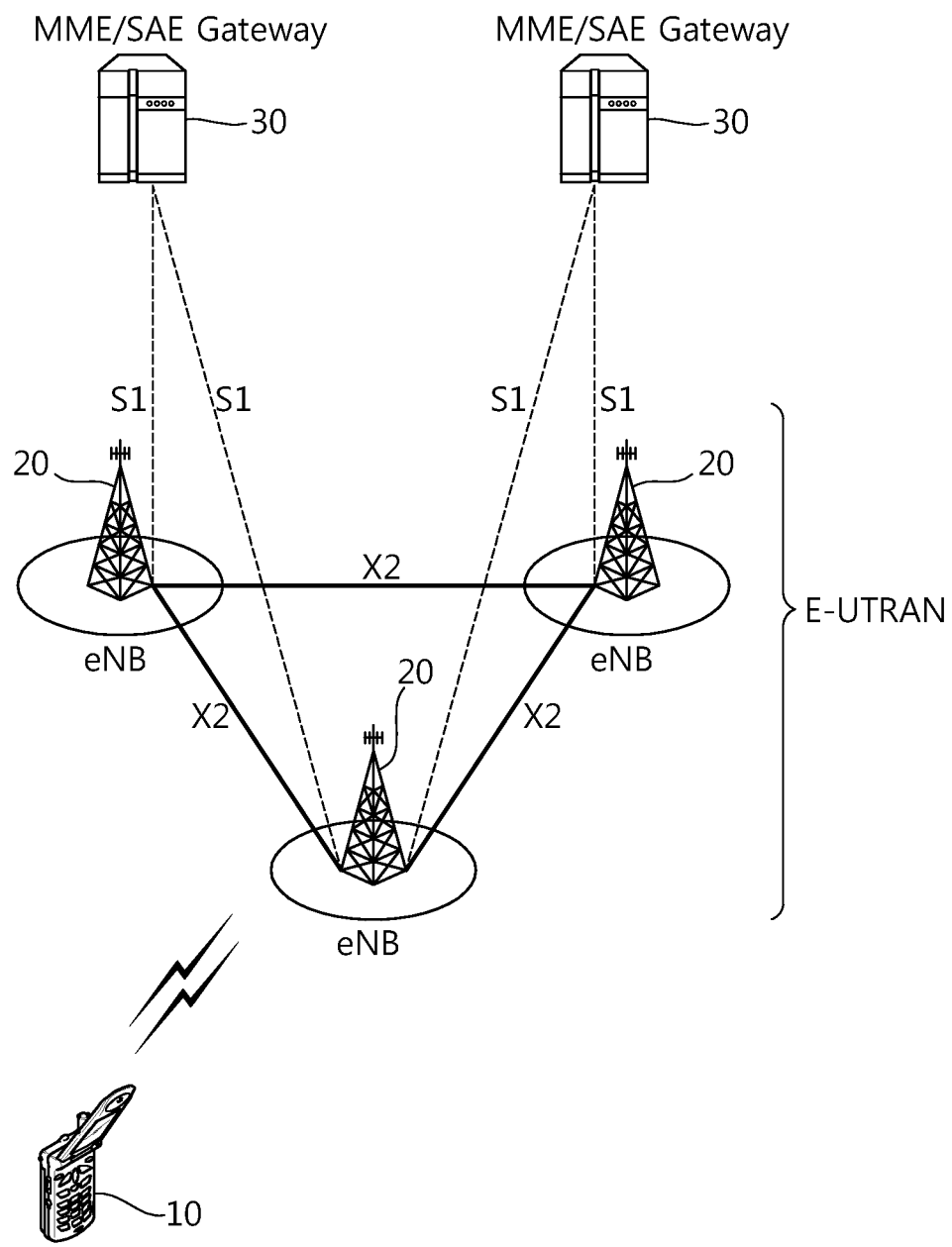
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 may be generally a fixed station that communicates with the UE 10 and may be referred to as another terminology, such as an evolved node-B (eNB), a base transceiver system (BTS), an access point, etc. There may be one or more cells within the coverage of the BS 20. A single cell may be configured to have one of bandwidths selected from 1.25, 2.5, 5, 10, and 20 MHz, etc., and may provide downlink or uplink transmission services to several UEs. In this case, different cells may be configured to provide different bandwidths.

Interfaces for transmitting user traffic or control traffic may be used between the BSs 20. The UE 10 and the BS 20 may be connected by means of a Uu interface. The BSs 20 may be interconnected by means of an X2 interface. The BSs 20 may be connected to an evolved packet core (EPC) by means of an S1 interface. The EPC may consist of a mobility management entity (MME), a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The MME is in charge of functionality of a control plane. The S-GW is in charge of functionality of a user plane. The BSs 20 may be connected to the MME 30 by means of an S1-MME interface, and may be connected to the S-GW by means of an S1-U interface. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
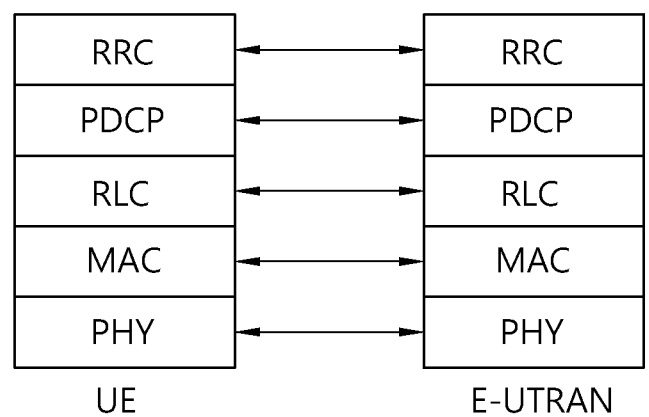
FIG. 2 is a diagram showing radio interface protocol architecture for a control plane.
Figure 3:
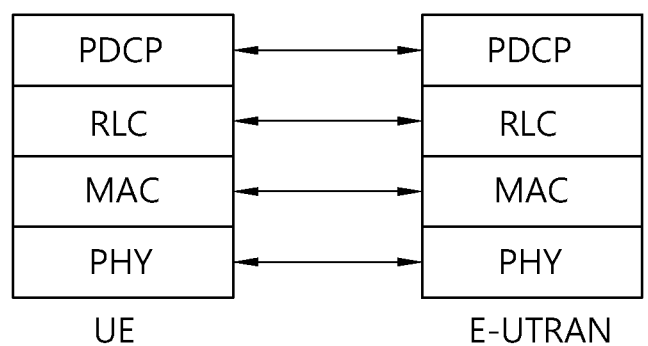
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN are classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane which is a protocol stack for control signal transmission and a user plane which is a protocol stack for data information transmission. The layers of the radio interface protocol may exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data may be transferred between the MAC layer and the PHY layer through the transport channel. The transport channel may be classified according to how and with what characteristics data is transmitted through a radio interface. Or, the transport channel may be classified into a dedicated transport channel and a common transport channel depending on whether or not to share the transport channel. Between different PHY layers, i.e., a PHY layer of a transmitter and a PHY layer of a receiver, data may be transferred through the physical channel. The physical channel may be modulated using an orthogonal frequency division multiplexing (OFDM) scheme, and utilizes time and frequency as a radio resource.

Figure 4:
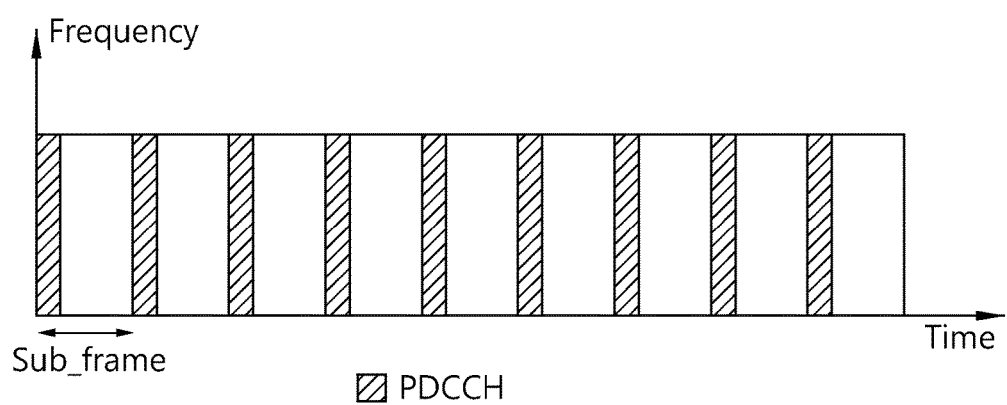
FIG. 4 shows an example of a physical channel structure.

FIG. 4 shows an example of a physical channel structure.

A physical channel may consist of a plurality of subframes in a time domain and a plurality of subcarriers in a frequency domain. One subframe may consist of a plurality of symbols in the time domain. One subframe may consist of a plurality of resource blocks (RBs). One RB may consist of a plurality of symbols and a plurality of subcarriers. In addition, each subframe may use specific subcarriers of specific symbols of a corresponding subframe for a physical downlink control channel (PDCCH). For example, a first symbol of the subframe may be used for the PDCCH. A transmission time interval (TTI) which is a unit time for data transmission may be equal to a length of one subframe.

A MAC layer belonging to the L2 provides a service to a higher layer, i.e., a radio link control (RLC), through a logical channel. A function of the MAC layer includes mapping between logical channels and transport channels and multiplexing/de-multiplexing for a transport block provided to a physical channel on a transport channel of a MAC service data unit (SDU) belonging to the logical channels. The logical channels are located above the transport channels, and are mapped to the transport channels. The logical channels may be divided into control channels for delivering information of the control plane and traffic channels for delivering information of the user plane.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC of a user equipment (UE) is logically connected to an RRC of an E-UTRAN. When an RRC connection is established between an RRC layer of the UE and an RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN can recognize the existence of the UE in RRC_CONNECTED and can effectively control the UE. Meanwhile, the UE in RRC_IDLE cannot be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE may establish the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A scheduling request (SR) is described below. It may be referred to Section 5.4.4 of 3GPP TS 36.321 V9.1.0 (2009-12).

An SR is used for requesting UL-SCH resources for new transmission.

When an SR is triggered, it may be considered as pending until it is cancelled. All pending SR(s) may be cancelled and sr-ProhibitTimer may be stopped when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the UE may set the SR_COUNTER to 0.

As long as one SR is pending, the UE shall for each TTI:
 if no UL-SCH resources are available for a transmission in this TTI:
  if the UE has no valid PUCCH resource for SR configured in any TTI: initiate a random access procedure and cancel all pending SRs;
  else if the UE has a valid PUCCH resource for SR configured for this TTI and if this TTI is not part of a measurement gap and if sr-ProhibitTimer is not running:
   if SR_COUNTER<dsr-TransMax:
    increment SR_COUNTER by 1;
    instruct a physical layer to signal the SR on PUCCH;
    start the sr-ProhibitTimer.
   else:
    notify RRC to release PUCCH/SRS;
    clear any configured downlink assignments and uplink grants;
    initiate a random access procedure and cancel all pending SRs.

Figure 5:
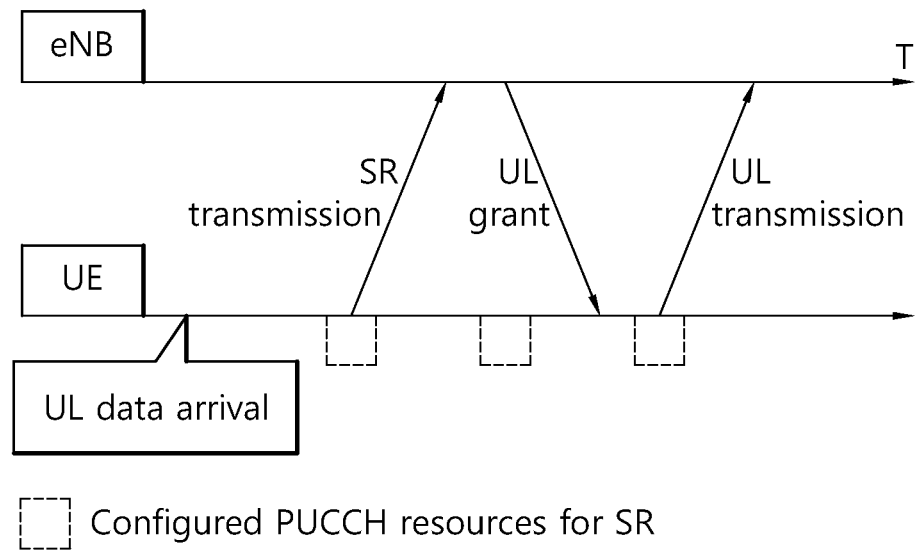
FIG. 5 shows an example of a scheduling request procedure.

FIG. 5 shows an example of a scheduling request procedure.

Referring to FIG. 5, a method for performing an SR procedure through a dedicated scheduling request (D-SR) channel is described. A BS allocates D-SR channels, having regular intervals, to a UE. If UL data arrives, the UE triggers a buffer status reporting (BSR). If the UE does not have allocated radio resources, the UE triggers an SR. After, the UE performs an SR procedure through the D-SR channels. Upon receiving the SR from the UE, the BS determines resource distribution and informs the UE allocated uplink radio resources to the UE through a PDCCH according to a scheduling algorithm. If the D-SR channels are not allocated to the UE, the UE performs an SR procedure through a random access procedure.

A buffer status reporting (BSR) is described below. It may be referred to Section 5.4.5 of 3GPP TS 36.321 V9.1.0 (2009-12).

A BSR procedure is used to provide a serving eNB with information about an amount of data available for transmission in UL buffers of a UE. An RRC may control the BSR reporting by configuring two timers periodicBSR-Timer and retxBSR-Timer and by, for each logical channel, optionally signaling logicalChannelGroup which allocates the logical channel to a logical channel group (LCG).

For the BSR procedure, the UE may consider all radio bearers which are not suspended and may consider radio bearers which are suspended.

The BSR procedure may be triggered if any of the following events occur:
 UL data, for a logical channel which belongs to a LCG, becomes available for transmission in an RLC entity or in an PDCP entity, and either the data belongs to a logical channel with higher priority than priorities of logical channels which belong to any LCG and for which data is already available for transmission, or there is no data available for transmission for any of logical channels which belong to a LCG, in which case the BSR is referred below to as "regular BSR";
 UL resources are allocated and number of padding bits is equal to or larger than a size of a BSR MAC control element (CE) plus its subheader, in which case the BSR is referred below to as "padding BSR";
 retxBSR-Timer expires and the UE has data available for transmission for any of logical channels which belong to a LCG, in which case the BSR is referred below to as "regular BSR";
 periodicBSR-Timer expires, in which case the BSR is referred below to as "periodic BSR".

For the regular BSR and the periodic BSR:
  if more than one LCG has data available for transmission in the TTI where the BSR is transmitted: report a long BSR;
  else report a short BSR.
For the padding BSR:
  if the number of padding bits is equal to or larger than a size of a short BSR plus its subheader but smaller than a size of a long BSR plus its subheader:
    if more than one LCG has data available for transmission in the TTI where the BSR is transmitted: report a truncated BSR of the LCG with the highest priority logical channel with data available for transmission;
    else report a short BSR.
  else if the number of padding bits is equal to or larger than a size of a long BSR plus its subheader, report a long BSR.
If the BSR procedure determines that at least one BSR has been triggered and not cancelled:
  if the UE has UL resources allocated for new transmission for this TTI:
    instruct multiplexing and assembly procedure to generate the BSR MAC CE(s);
    start or restart periodicBSR-Timer except when all the generated BSRs are truncated BSRs;
    start or restart retxBSR-Timer.
  else if a regular BSR has been triggered:
    if an uplink grant is not configured or the regular BSR was not triggered due to data becoming available for transmission for a logical channel for which logical channel SR masking (logicalChannelSR-Mask) is setup by upper layers:
      a scheduling request shall be triggered.

A MAC PDU may contain at most one MAC BSR CE, even when multiple events trigger a BSR by the time a BSR can be transmitted in which case the regular BSR and the periodic BSR shall have precedence over the padding BSR.

The UE may restart retxBSR-Timer upon indication of a grant for transmission of new data on any UL-SCH.

All triggered BSRs may be cancelled in case the UL grant(s) in this subframe can accommodate all pending data available for transmission but is not sufficient to additionally accommodate the BSR MAC CE plus its subheader. All triggered BSRs may be cancelled when a BSR is included in a MAC PDU for transmission.

The UE may transmit at most one regular/periodic BSR in a TTI. If the UE is requested to transmit multiple MAC PDUs in a TTI, it may include a padding BSR in any of the MAC PDUs which do not contain a regular/periodic BSR.

All BSRs transmitted in a TTI may always reflect a buffer status after all MAC PDUs have been built for this TTI. Each LCG may report at the most one buffer status value per TTI and this value may be reported in all BSRs reporting buffer status for this LCG.

In a random access procedure, backoff may be performed. In detail, in a random access procedure initialization, a backoff parameter value in the UE is set to 0 ms. In random access response reception, the UE may stop monitoring for random access response(s) after successful reception of the random access response containing random access preamble identifiers that matches the transmitted random access preamble. In this case, if the random access response contains a backoff indicator (BI) subheader, the backoff parameter value in the UE is set as indicated by a BI field of the BI subheader. Else, the backoff parameter value in the UE is set to 0 ms.

The backoff parameter values may be presented by Table 1.

TABLE 1

| Index | Backoff Parameter value (ms) |
| --- | --- |
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

The reserved values of the backoff parameter if received by the current release version UEs shall be taken as 960 ms.

If no random access response is received within the random access response window, or if none of all received random access responses contains a random access preamble identifier corresponding to the transmitted random access preamble, the random access response reception is considered not successful. In this case, the UE selects a random backoff time according to a uniform distribution between 0 and the packoff parameter value based on the backoff parameter in the UE, and delays the subsequent random access transmission by the backoff time.

Or, in contention resolution, if the contention resolution is considered not successful, the UE selects a random backoff time according to a uniform distribution between 0 and the backoff parameter value based on based on the backoff parameter in the UE, and delays the subsequent random access transmission by the backoff time.

When uplink congestion occurs at a cell, important access trials as well as normal access trials can be blocked. Currently, backoff is not performed for the SR. However, a method for performing backoff for the SR may be considered for prioritizing an SR for important access trials. Accordingly, a method for performing backoff for an SR may be proposed.

Figure 6:
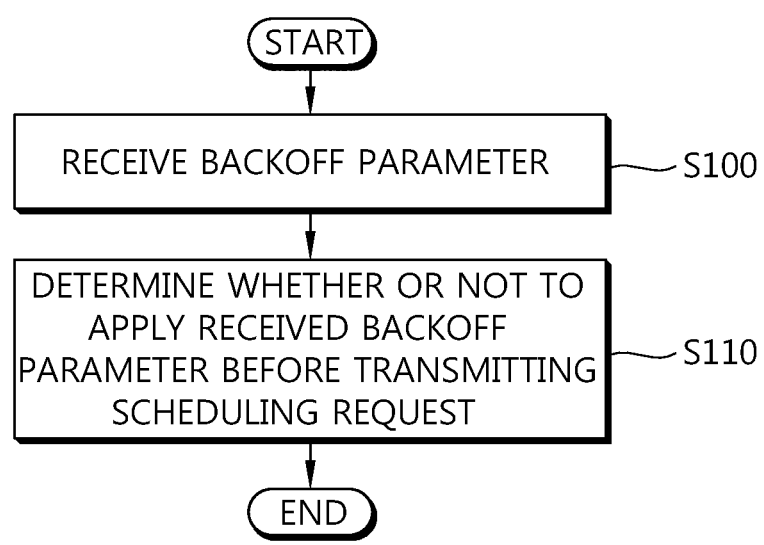
FIG. 6 shows an example of a method for scheduling UL transmission according to an embodiment of the present invention.

FIG. 6 shows an example of a method for scheduling UL transmission according to an embodiment of the present invention.

At step S100, the UE receives a backoff parameter from a network. At step S110, the UE determines whether or not to apply the received backoff parameter before transmitting an SR to the network via a dedicated channel.

Whether or not to apply the received backoff parameter may be determined according to a prioritized access. The prioritized access may correspond to a logical channel, traffic/bearer type, or logical channel priority including one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE). If the prioritized access is identified, it is determined not to apply the received backoff parameter for an SR. That is, the UE ignores the received backoff parameter before transmitting the SR to the network, according to the prior art. On the other hand, if the prioritized access is not identified, it is determined to apply the received backoff parameter for an SR. That is, the UE performs backoff based on the received backoff parameter before transmitting the SR to the network, according to an embodiment of the present invention.

Figure 7:
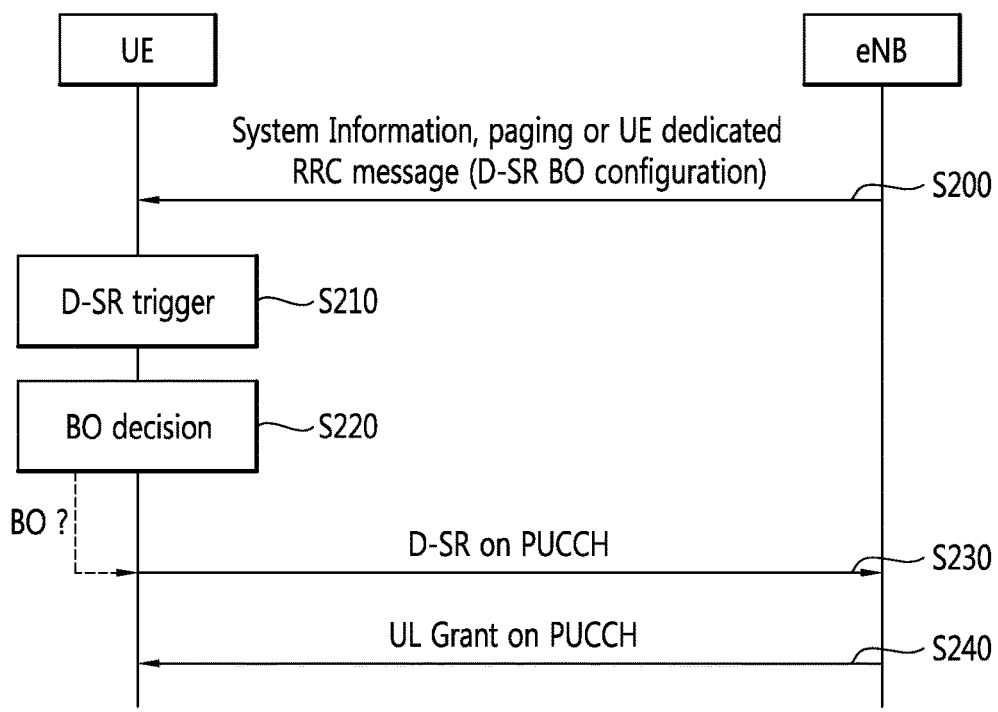
FIG. 7 shows another example of a method for scheduling UL transmission according to an embodiment of the present invention.

FIG. 7 shows another example of a method for scheduling UL transmission according to an embodiment of the present invention.

At step S200, for an SR via a PUCCH, the UE receives a backoff configuration via system information, paging, or UE dedicated RRC message, such as an RRC connection reconfiguration message. If the system information is used to carry the backoff configuration, the paging may be used to indicate whether or not the backoff configuration is carried in the system information.

The backoff configuration may indicate whether or not this cell supports performing backoff for an SR according to the embodiment of the present invention. That is, only if the backoff configuration indicates that this cell supports performing backoff for an SR according to the embodiment of the present invention, the UE can perform backoff for an SR accordring to the embodiment of the present invention. Otherwise, the UE does not perform backoff before transmitting an SR according to the prior art.

In addition, the backoff configuration can inform UEs for which establishment cause or traffic/bearer type UEs ignore backoff or apply a special backoff parameter before (re-) transmitting an SR when UEs need to perform backoff. For instance, the backoff configuration can indicate one or some of emergency access, high priority access, MMTEL-voice, MMTEL-video, and VoLTE. If the UE receives this backoff configuration, and if the UE has accessed for one of the indicated ones, the UE ignores backoff before transmitting an SR or applies a special backoff parameter before transmitting an SR.

Alternatively, the backoff configuration can indicate one or some of mobile originating (MO)-data, mobile terminating (MT) access, MMTEL-other, and data service. If the UE receives this backoff configuration, and if the UE has accessed for one of the indicated ones, the UE applies backoff before transmitting an SR.

Otherwise, the UE ignores backoff or applies a special backoff parameter before transmitting an SR.

The special backoff parameter may be provided via a random access response, system information, or UE dedicated RRC message.

At step S210, the UE triggers an SR procedure. The UE may receive the backoff information via a random access response, paging, system information or UE dedicated message, and then store the received backoff information. If the system information is used to carry the backoff information, the paging can be used to indicate whether or not the backoff information is carried in the system information.

At step S220, upon triggering the SR procedure, the UE decides whether or not to perform backoff before transmitting an SR based on the received backoff information. The received backoff information includes at least the backoff parameter. It is assumed that the UE receives the backoff parameter.

If the UE in RRC_CONNECTED has established this RRC connection for an establishment cause set to one of 'emergency access' and 'high priority access'; or, if the UE in RRC_CONNECTED has established this RRC connection for one or some of emergency access, high priority access, MMTEL-voice, MMTEL-video, and VoLTE; or, if the UE has established bearers for one or some of emergency access, high priority access, MMTEL-voice, MMTEL-video, and VoLTE; or if the UE initiates this SR to transmit a buffer status report for a specific logical channel, a specific logical channel group, or a signaling radio bearer (and if the specific logical channel or the specific logical channel group is indicated via system information, paging, or random access response); or if the UE initiates this SR to transmit MAC control element or control information in RLC/PDCP; or if the UE initiates this SR to transmit a NAS message or RRC message, the UE ignores the received backoff parameter and transmits the SR without backoff. Or, if the UE receives the existing backoff parameter in a random access response, and if the backoff parameter has a larger value than 960 ms, the UE applies backoff with 960 ms and then transmits the SR after backoff. But, if the backoff parameter value is 960 ms or less, the UE applies backoff with the value and then transmits the SR after backoff. Or, if the UE receives the special backoff parameter, the UE applies backoff and then transmits the SR after backoff.

Else, the UE applies the (existing) backoff parameter and then transmits the SR after backoff.

If the UE does not receive the backoff parameter, the UE transmits the SR without backoff.

At step S230, the UE transmits the SR on the PUCCH with or without backoff according to the previous steps.

At step S240, in response to the SR, the eNB may respond by transmitting a UL grant to the UE on a PDCCH.

Figure 8:
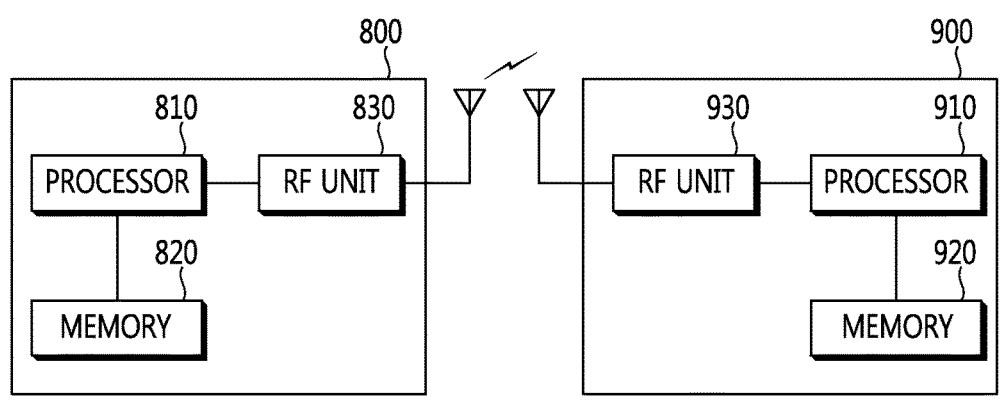
FIG. 8 is a block diagram showing wireless communication system to implement an embodiment of the present invention.

FIG. 8 is a block diagram showing wireless communication system to implement an embodiment of the present invention.

ABS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for scheduling uplink (UL) transmission in a wireless communication system, the method comprising:
   receiving, by a User Equipment (UE), a backoff parameter from a network via a radio resource control (RRC) message,
   wherein the backoff parameter relates to a transmission of a scheduling request (SR);
   determining, by the UE, whether or not to apply the received backoff parameter before transmitting the SR to the network via a dedicated channel;
   when it is determined that the received backoff parameter applies, transmitting, by the UE, the SR to the network via the dedicated channel according to the received backoff parameter; and
   wherein the backoff parameter is configured for a specific logical channel.

2. The method of claim 1, wherein determining whether or not to apply the received backoff parameter is based on a prioritized access.

3. The method of claim 2, wherein the prioritized access corresponds to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

4. The method of claim 2, wherein the received backoff parameter is not applied when the prioritized access is not identified.

5. The method of claim 4, further comprising:
   performing backoff based on the received backoff parameter before transmitting the SR to the network.

6. The method of claim 2, wherein the received backoff parameter is applied when the prioritized access is identified.

7. The method of claim 6, further comprising:
   when it is determined that the received backoff parameter is not applied, transmitting, by the UE, the SR to the network via the dedicated channel without delaying the transmission of the SR.

8. The method of claim 1, wherein the received backoff parameter relates to a value for a SR prohibit timer, and the value for the SR prohibit timer is configured by an upper layer.

9. The method of claim 8, wherein the value for the SR prohibit timer is used to indicate a time for delaying the transmission of the SR in units of subframes.

10. The method of claim 1, wherein the backoff parameter is configured by an upper layer.

11. A user equipment (UE) in a wireless communication system, the UE comprising:
    a transmitter and receiver; and
    a processor, coupled to the transmitter and receiver, that:
    controls the receiver to receive a backoff parameter from a network via a radio resource control (RRC) message, wherein the backoff parameter relates to a transmission of a scheduling request (SR); and
    determines whether or not to apply the received backoff parameter before the SR is transmitted to the network via a dedicated channel;
    when it is determined that the received backoff parameter applies, controlling the transmitter to transmit the SR to the network via the dedicated channel according to the received backoff parameter; and
    wherein the backoff parameter is configured for a specific logical channel.

12. The UE of claim 11, wherein the processor further determines whether or not to apply the received backoff parameter based on a prioritized access.

13. The UE of claim 12, wherein the prioritized access corresponds to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

14. The UE of claim 12, wherein the processor determines to apply the received backoff parameter when the prioritized access is not identified.

15. The UE of claim 12, wherein the processor determines to apply the received backoff parameter when the prioritized access is not identified.

* * * * *

UNITED STATES PATENT AND TRADEMARK OFFICE
CERTIFICATE OF CORRECTION

| | | |
|---|---|---|
| PATENT NO. | : 10,111,244 B2 | Page 1 of 1 |
| APPLICATION NO. | : 15/266856 | |
| DATED | : October 23, 2018 | |
| INVENTOR(S) | : Youngdae Lee et al. | |

It is certified that error appears in the above-identified patent and that said Letters Patent is hereby corrected as shown below:

In the Claims

Column 11, Line 33, Claim 1, change "configured" to --applied--.

Column 12, Line 32, Claim 11, change "configured" to --applied--.

Signed and Sealed this
Seventh Day of February, 2023

Katherine Kelly Vidal
*Director of the United States Patent and Trademark Office*